(12) United States Patent
Tokiwa et al.

(10) Patent No.: US 7,567,290 B2
(45) Date of Patent: Jul. 28, 2009

(54) CAMERA SYSTEM, CAMERA BODY, IMAGING LENS UNIT, AND INTERCHANGEABLE LENS CAMERA

(75) Inventors: Kentaro Tokiwa, Asaka (JP); Takehiko Senba, Asaka (JP); Satoshi Nakamura, Asaka (JP); Mikio Watanabe, Asaka (JP); Hiroshi Tanaka, Asaka (JP); Kazuhiro Tokuda, Asaka (JP); Kazukiyo Tamada, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 723 days.

(21) Appl. No.: 11/091,872

(22) Filed: Mar. 29, 2005

(65) Prior Publication Data

US 2005/0212949 A1 Sep. 29, 2005

(30) Foreign Application Priority Data

| Mar. 29, 2004 | (JP) | ............................. 2004-094023 |
| Mar. 29, 2004 | (JP) | ............................. 2004-094042 |
| Mar. 29, 2004 | (JP) | ............................. 2004-094883 |

(51) Int. Cl.
*G03B 17/00* (2006.01)
*G02B 13/16* (2006.01)
*H04N 5/225* (2006.01)

(52) U.S. Cl. ....................... 348/360; 348/335; 396/529; 396/532

(58) Field of Classification Search ......... 348/335–360; 396/529–532
See application file for complete search history.

(56) References Cited

U.S. PATENT DOCUMENTS

| 4,457,609 | A | * | 7/1984 | Tomino et al. ............... 396/532 |
| 4,464,034 | A | | 8/1984 | Tomino |
| 4,664,496 | A | * | 5/1987 | Shinoda et al. ............. 396/169 |
| 4,748,467 | A | * | 5/1988 | Maekawa et al. ........... 396/532 |
| 4,766,453 | A | * | 8/1988 | Shiokama et al. ........... 396/532 |
| 4,812,865 | A | * | 3/1989 | Ueyama ..................... 396/530 |
| 5,012,264 | A | * | 4/1991 | Nagano et al. .............. 396/301 |
| 5,021,812 | A | | 6/1991 | Kohno et al. |

(Continued)

FOREIGN PATENT DOCUMENTS

JP 48-3134 1/1973

(Continued)

OTHER PUBLICATIONS

Author: Dario Bonazza Title: Sptomatic Date: Apr. 2003 vol. 36 Pertinent pages : Article titled : From K to J: the end of legendary Pentax compatibility.*

(Continued)

*Primary Examiner*—Sinh N Tran
*Assistant Examiner*—Daniel M Pasiewicz
(74) *Attorney, Agent, or Firm*—Sughrue Mion, PLLC

(57) ABSTRACT

A camera with a removable imaging lens unit is a small and reliable camera which can prevent electrostatic discharge from causing breakdown or malfunctions. Electrical contact points on a camera body are covered and protected by a mount barrier. When mounting the imaging lens unit on the camera body, a push head is placed in contact with the mount barrier and pushes the mount barrier. After the push head pushes down the mount barrier against the urging force of the spring, electrical contact points on the lens unit are connected with the electrical contact points on the camera body.

9 Claims, 16 Drawing Sheets

U.S. PATENT DOCUMENTS

| | | | |
|---|---|---|---|
| 5,079,578 A | | 1/1992 | Kohno et al. |
| 5,185,622 A | * | 2/1993 | Yoshibe et al. ............... 396/532 |
| 5,359,379 A | * | 10/1994 | Kohno et al. .................. 396/80 |
| 5,570,150 A | * | 10/1996 | Yoneyama et al. ........... 396/324 |
| 5,594,517 A | * | 1/1997 | Tsunefuji ...................... 396/87 |
| 5,889,555 A | * | 3/1999 | Kawase et al. ............... 348/336 |
| 6,269,222 B1 | * | 7/2001 | Hartung ....................... 396/301 |
| 2002/0032911 A1 | * | 3/2002 | Tanaka et al. ................ 725/153 |
| 2002/0114027 A1 | | 8/2002 | Horimai |
| 2003/0063342 A1 | | 4/2003 | Horimai |
| 2004/0062545 A1 | * | 4/2004 | Ushiro ......................... 396/529 |
| 2004/0252991 A1 | * | 12/2004 | Kawai et al. ................. 396/529 |

FOREIGN PATENT DOCUMENTS

| | | |
|---|---|---|
| JP | 58-072132 | 4/1983 |
| JP | 58-075138 | 5/1983 |
| JP | 58-083823 | 5/1983 |
| JP | 63-029742 | 2/1988 |
| JP | 4-11850 B2 | 3/1992 |
| JP | 7-059366 A | 3/1995 |
| JP | 7-34094 B2 | 4/1995 |
| JP | 9-5850 A | 1/1997 |
| JP | 2000-241869 A | 9/2000 |
| JP | 2003-99952 A | 4/2003 |
| JP | 2003-156790 A | 5/2003 |

OTHER PUBLICATIONS

Author: Bojidar Dimitrov et al Title: Summary of the K-Mount Evolution, Names, and Features Date: Waybackmachine dates it to : Jul. 2002 Web Address: http://kmp.bdimitrov.de/technology/summary/index.html.*

Author: Bojidar Dimitrov et al Title: Features and Operation of the KAF Mount Date: Waybackmachine dates it to : Apr. 2003 Web Address: http://kmp.bdimitrov.de/technology/K-mount/Kaf.html.*

Author: Bojidar Dimitrov et al Title: Features and Operation of the KAF2 Mount Date: Waybackmachine dates it to : Apr. 22, 2003 Web Address: http://kmp.bdimitrov.de/technology/K-mount/Kaf2.html.*

* cited by examiner

CAMERA SYSTEM, CAMERA BODY, IMAGING LENS UNIT, AND INTERCHANGEABLE LENS CAMERA

BACKGROUND OF THE INVENTION

1. Field of the Invention

The present invention relates to an imaging lens unit equipped with a photographic optical system and an image pick-up device, a camera body on which the imaging lens unit is mounted removably, a camera system consisting of the imaging lens unit and camera body, and an interchangeable lens camera which makes many electrical connections for information transmission and operation control between the lens unit and camera body.

2. Description of the Related Art

Conventionally, removable-lens camera systems in which an image taking lens is mounted removably on a camera body is known in the field of film cameras.

Recently, digital cameras with removable lens units have been proposed in the field of digital cameras as in the field of film cameras.

For example, a camera system with a removable lens unit has been proposed in which multiple projections are formed on the outer periphery of the base end of a lens unit which unites an image taking lens and image pickup device, engaging parts to be engaged with the projections are formed in a lens mount on the camera body, the lens unit is turned by engaging the projections on the lens unit with the engaging parts on the lens mount, and thereby a connector in the lens unit is connected with a connector on the camera body (see, for example, Japanese Patent Laid-Open No. 2003-156790).

With this technique, electrical contacts of the connector on the camera body are exposed when the lens unit is not mounted on the camera body. Consequently, if an electrostatically-charged hand is brought near the electrical contacts, electrostatic discharge may cause trouble such as breakdown of internal elements or malfunctions of the camera system. Also, if the lens unit is connected to the camera body when it is electrostatically-charged, the electrostatically-charged lens unit will discharge into the camera body. This may result in breakdown of internal elements or malfunctions of the camera system.

A camera has been disclosed, which is equipped with a lens mount section in which a removable image taking lens is mounted, and an image pickup means which picks up an image of a subject formed by the image taking lens, wherein the camera is further equipped with a lens detection means which detects whether an image taking lens is mounted in the lens mount section, in order to prevent the camera from malfunctioning if static electricity is applied to the camera by a human body or the like with an image taking lens yet to be mounted; and power shutdown means which shuts down power supply to the image pickup means if the lens detection means detects that no image taking lens is mounted (see, for example, Japanese Patent Laid-Open No. 9-5850).

This technique has a problem in that it tends to increase costs because the camera must be equipped with a lens detection means which detects the presence or absence of an image taking lens and a power shutdown means which shuts down power supply to the image pickup means when no image taking lens is mounted.

This camera can prevent malfunctions because it shuts down power supply as appropriate. However, since the electrical contacts of the camera body is electrically connected with internal circuits, even if power supply is shut down, there remains a danger that electrostatic discharge may cause breakdown of internal circuits if an electrostatically-charged human body or the like is brought near the electrical contacts.

With interchangeable lens cameras, when the lens unit and camera body are coupled, electrical coupling must be provided simultaneously for both communications and power supply between the lens unit and camera body. For that purpose, connection terminals are provided in the mount section. Since the connection terminals are exposed, for example, on the camera body when no lens unit is mounted on the camera body, if they are touched accidentally with a metal strip such as a coin or a clip, they may cause an electrical short circuit, damaging internal circuits. To solve this problem, various techniques have been developed.

For example, there is a technique which involves arranging multiple camera-body-side electrical connection terminals approximately around an optical axis, installing at least two power supply terminals in such a way as to provide height differences with steps formed in the direction of contact, forming juts which protrude from the connection terminals in the direction of contact at locations orthogonal to the connection terminals, and forming missing parts at locations which correspond to the juts when mounts are coupled and decoupled (see, for example, Japanese Patent Laid-Open No. 7-34094).

This technique provides steps at placement locations of the power supply terminals in the camera mount section to prevent any metallic foreign object getting inside from causing a short circuit. Since this technique provides height differences among terminals, it cannot deal with shapes other than flat shapes. Also, since the technique handles only power supply terminals, problems of noise, interference with other terminals, etc. remain to be solved.

An interchangeable lens has been proposed which has urging members for urging contactors so that contactors in the interchangeable-lens mount section will come into contact with contactors on the camera body, wherein the contactors are arranged on the same circumference in a plane perpendicular to the optical axis of the lens in such a way that multiple contactors slide when the lens is turned, and power supply terminals are spaced differently from other terminals (see, for example, Japanese Patent Laid-Open No. 4-11850).

This technique prevents electrical short circuits by placing terminals at different intervals so that power supply terminals or ground terminals will not touch signal lines when the lens is mounted and removed. However, it cannot deal with trouble caused by insertion of a foreign object.

Conventional single-lens reflex cameras almost do not need communications functions between lens and body. Thus, they have a small number of terminals and it is difficult to accommodate multi-conductor cables. Also, terminals are placed in blocks, making it difficult to avoid noise depending on the type of electrical signal. Besides, there may be a problem of interference.

With interchangeable lens cameras, when no lens unit is mounted, it is necessary to keep dirt, dust, and other foreign matter from entering an opening provided in the mating part between camera body and lens unit. In the case of a lens unit with a built-in image pick up device, in particular, dirt or the like sticking to the connection terminals located between camera body and lens unit will reduce the accuracy of the camera greatly. Thus, such lens units must be kept free of dirt and the like.

To deal with this situation, an image pickup apparatus has been proposed which has a casing with an opening that allows light to enter an imaging lens unit; and a cover that can move between closing position and opening position of the opening, wherein the cover moves from the closing position to the opening position by being pushed when the imaging lens unit is mounted (see, for example, Japanese Patent Laid-Open No. 2003-099952).

This technique places a barrier in the camera mount section to prevent dirt and the like from entering a contact section and is applicable only when the direction of engagement between lens unit and camera body coincides with the direction of insertion. It is difficult to apply this technique to a mechanism which involves inserting the lens unit in the camera body and turning it around the optical axis to engage the lens unit with the camera body.

Besides, as a technique for keeping off dirt from surfaces of an image pickup apparatus when the lens unit is removed, an apparatus has been proposed which is equipped with a transparent cover to keep inner space of a structure airtight when the lens unit is removed (see, for example, Japanese Patent Laid-Open No. 2000-241869).

This technique can provide protection for optical parts because the camera mount section is equipped with the transparent cover. However, no mention is made of any electrical contact section. Protection for the contact section should be provided separately.

SUMMARY OF THE INVENTION

The present invention has been made in view of the above circumstances and provides a small and reliable camera system which can prevent electrostatic discharge from causing breakdown or malfunctions when a lens unit is mounted or removed as well as a camera body and a lens unit composing the camera system.

Also, the present invention provides a system containing an interchangeable lens camera which is not liable to cause a short circuit even if foreign matter enters into a camera mount of a camera body when no lens unit is mounted, can deal with increases in the number of signal lines, and can keep signal terminals free of noise or interference.

Furthermore, the present invention provides an interchangeable lens camera which employs a technique for inserting a lens unit in a camera body and turning it around an optical axis to engage the lens unit with the camera body and has a barrier in an opening to protect an electrical contact section.

To achieve the above objects, the present invention provides a camera system that has an imaging lens unit equipped with a photographic optical system and an image pickup device; and a camera body which is equipped with a concave mount section to removably mount the imaging lens unit, communicates with the imaging lens unit mounted in the mount section, and performs signal processing on image signals received from the imaging lens unit.

According to this invention, the camera body has:

(a) body-side electrical contact points installed in the mount section and used to communicate with the imaging lens unit, and (b) a mount barrier which is connected to an electrical ground of the camera body, covers an opening in the mount section, and retreats into a recess in the mount section by being pushed by the imaging lens unit when the imaging lens unit is mounted.

Also, according to this invention, the imaging lens unit has:

(c) a push head which is connected to an electrical ground of the imaging lens unit, connects the ground of the imaging lens unit with a ground of the camera body by abutting on the mount barrier when the imaging lens unit is mounted, and pushes the mount barrier into a recess in the mount section, and (d) lens-unit-side electrical contact points which are located farther from the camera body than the push head as viewed from the camera body with the imaging lens unit mounted and are connected with the body-side electrical contact points as the push head starts to push the mount barrier into the recess in the mount section when the imaging lens unit is mounted.

In the camera system according to this invention, when the imaging lens unit is not mounted on the camera body, the body-side electrical contact points are covered by the mount barrier connected to the electrical ground of the camera body. On the other hand, when mounting the imaging lens unit on the camera body, the electrical ground of the imaging lens unit and electrical ground of the camera body are connected with each other before the lens-unit-side electrical contact points and body-side electrical contact points are connected with each other. Thus, the camera system can prevent breakdown and malfunctions caused by electrostatic discharge regardless of whether the imaging lens unit is mounted or not.

Preferably, the mount barrier covers the opening in the mount section by being urged by a spring; and the mount barrier retreats into the recess in the mount section by being pushed by the push head when the imaging lens unit is mounted and returns under the force of the spring to the position where the mount barrier covers the mount opening when the imaging lens unit is removed.

When the camera system according to this invention is configured as described above, by simply installing a spring, it is possible to protect the camera body from breakdown and malfunctions caused by electrostatic discharge as well as from intrusion of dirt after the imaging lens unit is removed from the camera body.

Also, preferably when the imaging lens unit is removed from the camera body, the lens-unit-side electrical contact points and the body-side electrical contact points are positioned electrically apart from each other while the push head and the mount barrier remain in contact.

When the camera system according to this invention is configured as described above, it is possible to protect the camera body from breakdown and malfunctions caused by electrostatic discharge more reliably when the imaging lens unit is removed from the camera body.

Also, to achieve the above objects, the present invention provides a camera body which has a concave mount section to removably mount an imaging lens unit equipped with a photographic optical system and an image pickup device, communicates with the imaging lens unit mounted in the mount section, and performs signal processing on image signals received from the imaging lens unit, the camera body having:

(e) body-side electrical contact points installed in the mount section and used to communicate with the imaging lens unit; and (f) a mount barrier which is connected to an electrical ground of the camera body, covers an opening in the mount section, and retreats into a recess in the mount section by being pushed by the imaging lens unit when the imaging lens unit is mounted.

The camera body according to this invention is equipped with a mount barrier which is connected to an electrical ground of the camera body, covers an opening in the mount section to enclose the body-side electrical contact points in the camera body when no imaging lens unit is mounted on the camera body, and retreats into a recess in the mount when the imaging lens unit is mounted. Thus, it is possible to prevent breakdown and malfunctions caused by electrostatic discharge of the camera system regardless of whether the imaging lens unit is mounted or not.

Also, the present invention provides an imaging lens unit which is equipped with a photographic optical system and an image pickup device, is removably mounted in a concave mount section provided on a camera body, and transmits image signals obtained by the image pickup device to the camera body, wherein the camera body has:

(g) body-side electrical contact points installed in the mount section and used to communicate with the imaging lens unit, and (h) a mount barrier which is connected to an electrical ground of the camera body, covers an opening in the mount section, and retreats into a recess in the mount section by being pushed by the imaging lens unit when the imaging lens unit is mounted, and the imaging lens unit has:

(i) a push head which is connected to an electrical ground of the imaging lens unit, connects the ground of the imaging lens unit with a ground of the camera body by abutting on the mount barrier when the imaging lens unit is mounted, and pushes the mount barrier into a recess in the mount section, and (j) lens-unit-side electrical contact points which are located farther from the camera body than the push head as viewed from the camera body with the imaging lens unit mounted and are connected with the body-side electrical contact points as the push head starts to push the mount barrier into the recess in the mount section when the imaging lens unit is mounted.

Since the imaging lens unit according to this invention is equipped with the push head, when mounting the imaging lens unit on the camera body, the electrical ground of the imaging lens unit and electrical ground of the camera body are connected with each other before the lens-unit-side electrical contact points and body-side electrical contact points are connected with each other. This makes it possible to prevent breakdown and malfunctions caused by electrostatic discharge, using a simple configuration.

Also, the present invention provides an interchangeable lens camera, wherein electrical connection terminals between lens unit and camera body are divided into multiple blocks according to types, and the separated blocks are disposed at separate locations on a circumference of a connection section of a mount section on the interchangeable lens camera.

This invention is especially suitable when a large number of communications functions are required between lens unit and camera body. It prevents short circuits, noise, interference, etc. by dividing the electrical connection terminals into ground, power supply, and signal terminal blocks independent of each other.

If power supply terminals are positioned in such a way as to be connected later than other terminals when mounting the lens unit on the camera body, the interchangeable lens camera can be made fool proof, eliminating the possibility that inadvertent voltage loads will be applied to circuits before a normal electric circuit is formed.

In the interchangeable lens camera, more preferably, the signal terminal block is further divided into multiple signal terminal blocks. For example, the terminals can be divided into blocks such as a power supply block, a high-speed serial block, an analog block, a 5-volt block, a 3-volt block, and other terminal blocks. The signal terminals can be divided into multiple independent blocks according to types of signals.

In the interchangeable lens camera, preferably, the connection terminals in the separated blocks are formed in multiple layers along the optical axis. This makes it possible to dispose a large number of connection terminals in a small space. The space can be used efficiently if the multiple layers of connection terminals are arranged in a grid, a honeycomb, or a staggered pattern.

Preferably, the multiple separated blocks are disposed on the back of respective mount claws to prevent contact with foreign matter. The back of the mount claws means back surfaces of the mount claws and space hidden behind the mount claws when the mount on the camera body is viewed from out of the camera.

According to another aspect, the present invention provides an interchangeable lens camera, wherein electrical connection terminals between the lens unit and the camera body except for grounds are divided into multiple blocks according to types, the separated blocks are disposed at separate locations on a circumference of a connection section of a mount section on the interchangeable lens camera, and the lens unit and camera body contact directly for grounding.

In this case, conductor sections of the lens unit and the camera body contact directly and connection terminals for grounding can be omitted.

The present invention provides an interchangeable lens camera in which a lens unit is pushed in along an optical axis, turned around the optical axis, and thereby engaged with a camera body, wherein: the camera body is equipped with a barrier urged against an insertion direction of the lens unit; the barrier is configured to retract along with insertion of the lens unit and reveal camera-body-side contact points along with the retraction; and the lens unit is equipped with contact points which engage with the camera-body-side contact points when the lens unit is turned around the optical axis into engagement with the camera body.

According to this invention, which is intended to protect contact points, the opening opens when the barrier retracts, revealing the camera-side contact points.

In the interchangeable lens camera according to this invention, contact points can be protected properly if the camera-body-side contact points are disposed on the back of the mount claws on the camera body.

Also, in the interchangeable lens camera, preferably a contact surface of the barrier which comes into contact with the lens unit is equipped with rubber or coated with a rubberized paint. This makes the contact surface of the barrier elastic, thereby improving dust-proofing and drip-proofing effects and providing protection for the contact points when the barrier is engaged with the mount.

Also, preferably, the barrier is a transparent member to make the barrier optically transmissive and thereby prevent intrusion of foreign matter. This also makes it easier to look inside the camera.

BRIEF DESCRIPTION OF THE DRAWINGS

FIG. 6(b) is a longitudinal sectional view of FIG. 6(a);

DETAILED DESCRIPTION OF THE INVENTION

An embodiment of the present invention will be described with reference to the drawings.

Figure 1:
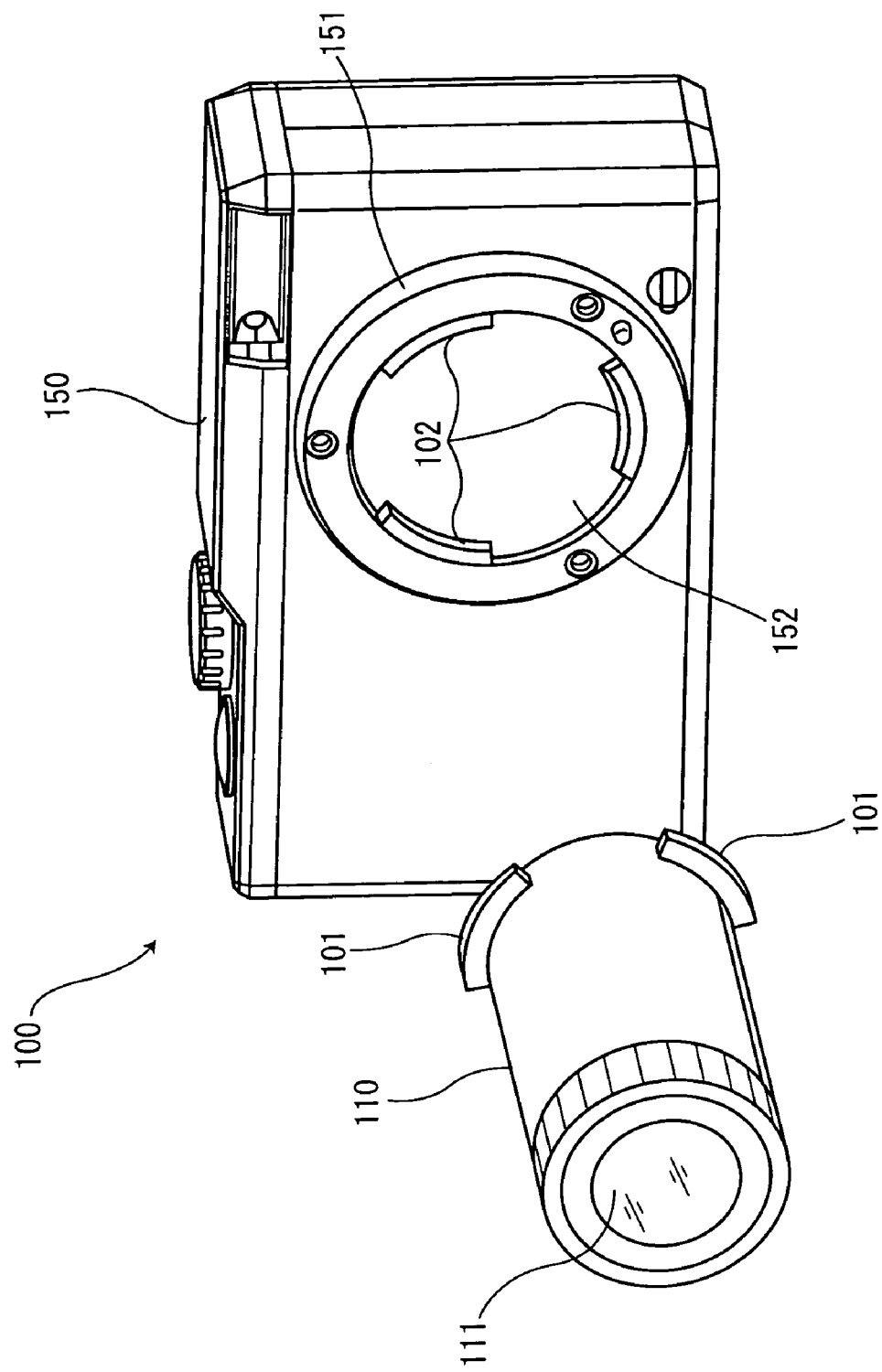
FIG. 1 is an external view showing an embodiment of a camera system according to the present invention.

FIG. 1 is an external view showing an embodiment of a camera system according to the present invention.

As shown in FIG. 1, the camera system 100 is an interchangeable lens camera system which has an imaging lens unit 110 and camera body 150. The imaging lens unit 110 is mounted on the camera body 150 by engaging multiple projections 101 provided on the base of the imaging lens unit 110 with engaging parts 102 provided inside a concave mount section 151 which is provided on the camera body 150 and in which the imaging lens unit 110 is mounted removably.

The imaging lens unit 110 is equipped with a photographic optical system 111 and an image pickup device (not shown). The camera body 150 is equipped with the mount section 151; body-side electrical contact points (not shown) located inside the mount section 151 and used to communicate with the imaging lens unit 110; and a mount barrier 152 which is connected to an electrical ground of the camera body 150, covers an opening in the mount section 151, and retreats into a recess in the mount section 151 by being pushed by the imaging lens unit 110 when the imaging lens unit 110 is mounted. The camera body 150 communicates with the imaging lens unit 110 mounted in the mount section 151 and performs signal processing on image signals received from the imaging lens unit 110.

Figure 2:
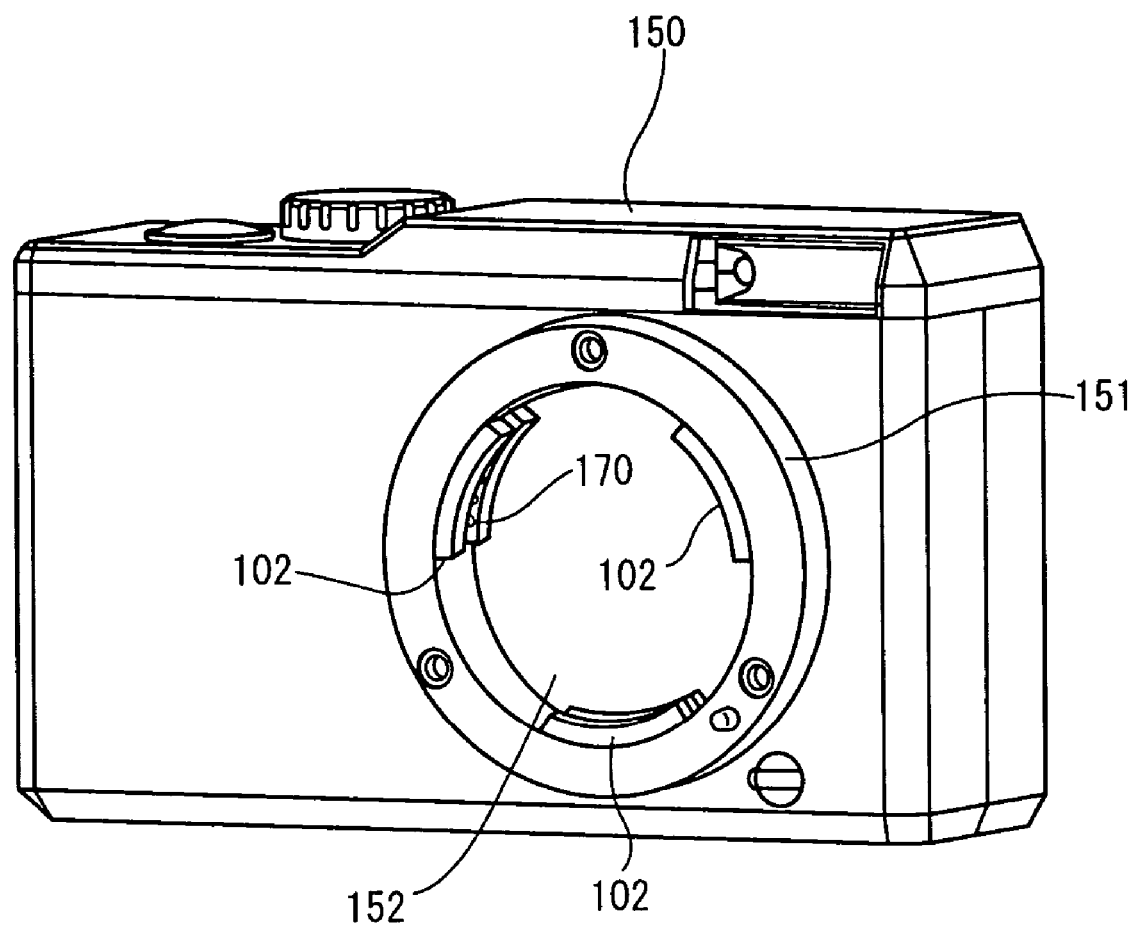
FIG. 2 is an external view showing a camera body in the camera system shown in FIG. 1 with an imaging lens unit mounted but not shown.

FIG. 2 is a perspective view showing the camera body 150 in the camera system shown in FIG. 1 with the imaging lens unit mounted but not shown.

After the imaging lens unit (not shown) is mounted on the camera body 150, the mount barrier 152 retreats into the recess in the mount section 151 by being pushed by a push head on the imaging lens unit 110 as shown in FIG. 2. When the push head comes into contact with the mount barrier 152, the grounds of the imaging lens unit and camera body are electrically connected with each other to be at the same potential. When the imaging lens unit 110 is turned in a predetermined direction in this state, the projections 101 (see FIG. 1) on the imaging lens unit 110 engage with the engaging parts 102 in the mount section 151. Accordingly, the lens-unit-side electrical contact points (not shown) and body-side electrical contact points 170 are electrically connected with each other to complete the mounting of the imaging lens unit 110 on the camera body 150.

Although in this embodiment, the projections 101 and the engaging parts 102 are engaged with each other through rotation as shown in FIGS. 1 and 2, the camera system according to the present invention is not limited to this. For example, they may be engaged by simply pressing the imaging lens unit against the mount section on the camera body 150.

Figure 3:
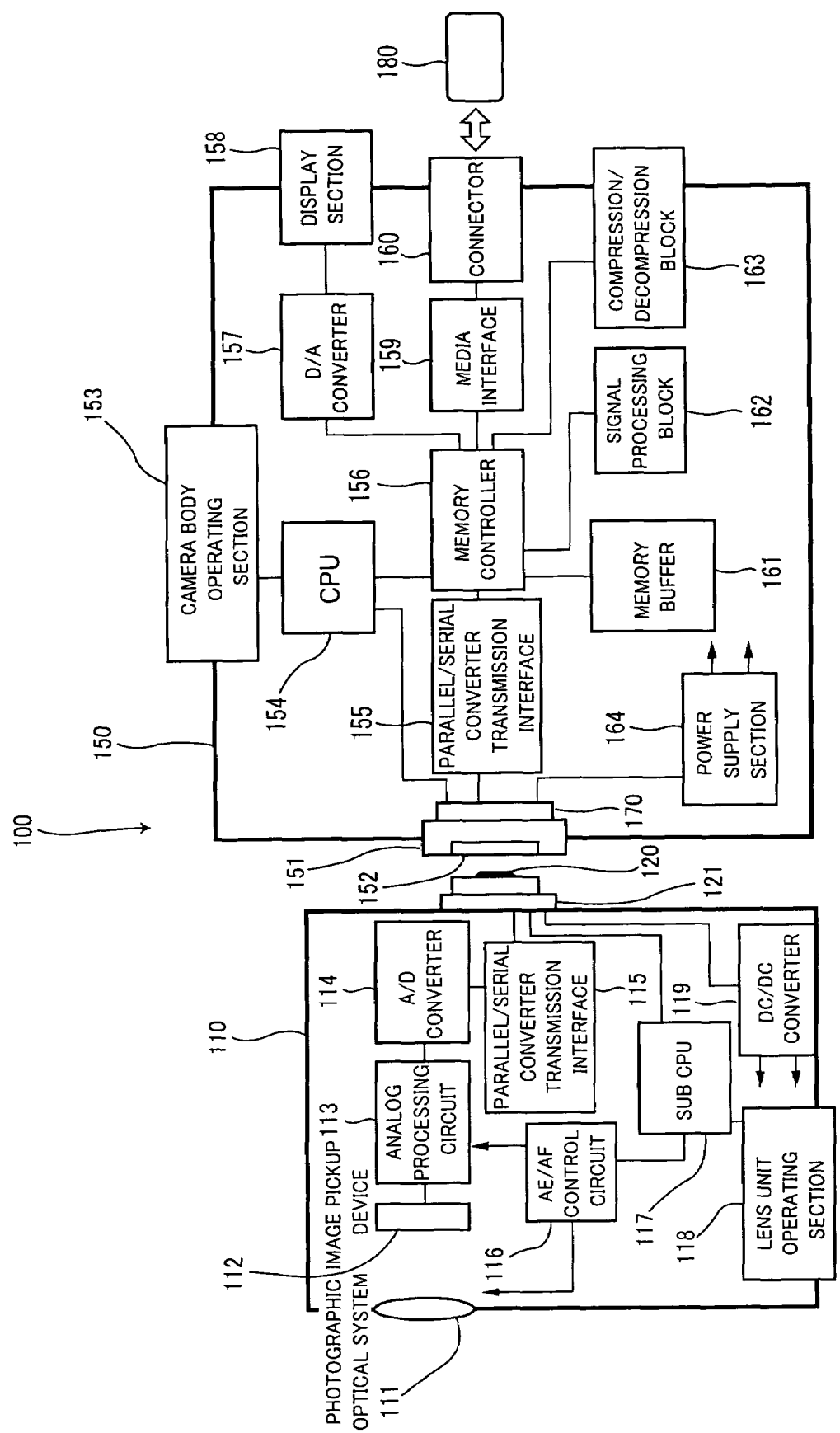
FIG. 3 is a block diagram showing the embodiment of the camera system according to the present invention.

FIG. 3 is a block diagram showing the embodiment of the camera system according to the present invention.

As shown in FIG. 3, the camera system 100 has an imaging lens unit 110 and a camera body 150, where the imaging lens unit 110 is equipped with a photographic optical system and an image pickup device. The camera body 150 is equipped with a concave mount section 151 in which the imaging lens unit 110 is mounted removably and performs signal processing on image signals received from the imaging lens unit 110.

In addition to the push head 120 and lens-unit-side electrical contact points 121 described above, the imaging lens unit 110 has a lens unit operating section 118 which receives operation commands from the camera user, an AE/AF control circuit 116 for automatic exposure control/automatic focus control, a sub CPU (Central Processing Unit) 117 which controls operation of various parts of the imaging lens unit 110, a DC/DC converter 119 which converts a DC voltage received from the camera body 150 via the lens-unit-side electrical contact points 121 into DC voltages needed by various parts of the imaging lens unit 110.

After a photograph is taken with the photographic optical system 111, an image signal (CCD_RAW) outputted from an image pickup device 112 is subjected to gain adjustment, noise reduction, and other processes by an analog processing circuit 113, converted into a digital signal with an A/D (Analog/Digital) converter 114, converted into a digital serial signal with a parallel/serial converter transmission interface 115, and then transmitted to the camera body 150 via the lens-unit-side electrical contact points 121 and the body-side electrical contact points 170. Incidentally, the image pickup device 112 may be a CCD (Charge Coupled Device), a CMOS (Complimentary Metal Oxide Semiconductor), or the like.

In addition to the body-side electrical contact points 170, mount section 151, and mount barrier 152, the camera body 150 is equipped with a camera body operating section 153 which receives operation commands from the camera user; CPU 154 which controls the entire camera body 150; signal processing block 162 which performs white balance correction and gamma correction on a CCD_RAW signal received from the imaging lens unit 110 as well as converts the CCD_RAW signal into a YCbCr signal (luminance/hue difference signal); memory buffer 161 which temporarily stores the CCD_RAW signal, YCbCr signal, and compressed data; memory controller 156 which controls the memory buffer 161; parallel/serial converter transmission interface 155 which performs parallel/serial conversion on signals transmitted and received to/from the imaging lens unit 110; compression/decompression block 163 which compresses/decompresses the YCbCr signal; D/A converter 157 which converts digital signals stored in the memory buffer 161 into analog signals; display section 158 such as an LCD (Liquid Crystal Display) which displays image information provided by the analog signal produced by the D/A converter 157; media interface 159 and connector 160 used to record compressed image information on an external recording medium 180 such as a memory card; power supply section 164 which supplies necessary power to various parts of the camera body 150 and supplies necessary power to the imaging lens unit 110 via the body-side electrical contact points 170.

Incidentally, FIG. 3 shows only an embodiment of the camera system according to the present invention. The camera system according to the present invention is not limited to the above embodiment shown in FIG. 3. It can be configured in various ways according to application and depending on variations of the imaging lens, the pixel count of the CCD, still or motion picture photography, the presence or absence of auxiliary photographic mechanisms such as a camera shake compensation mechanism, etc. For example, it can be configured as a camera system with multiple CCDs and lens units for stereoscopic photography.

Figure 4:
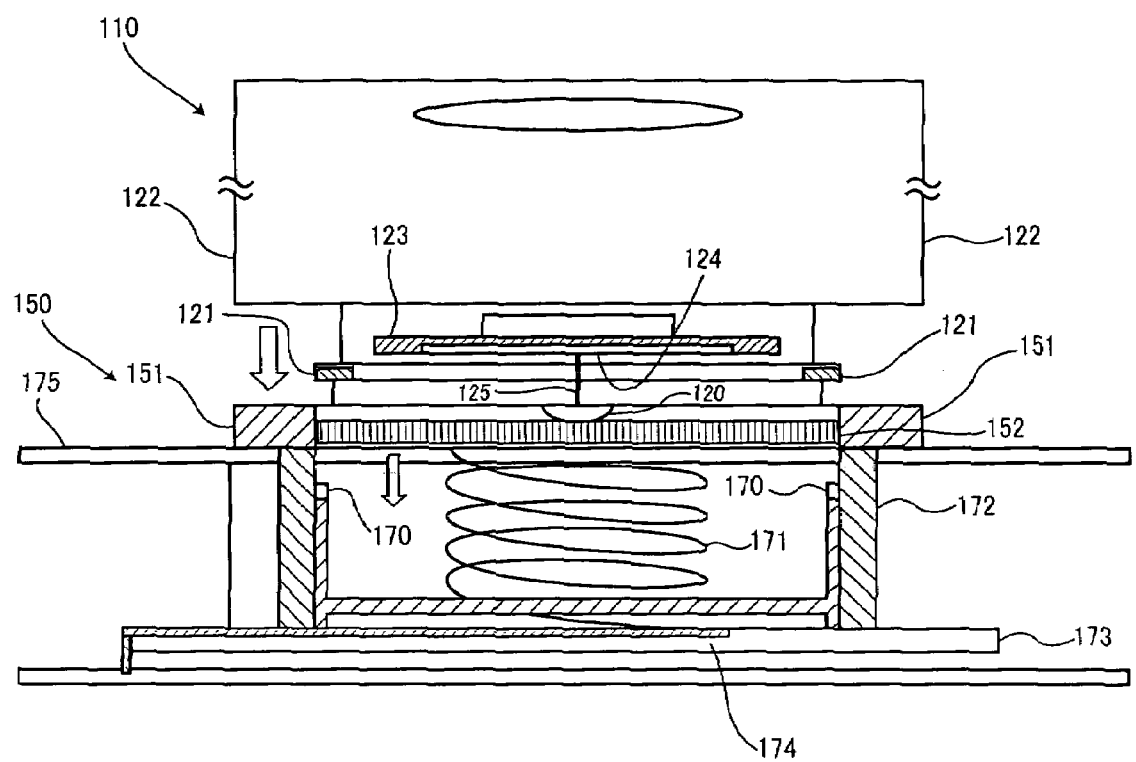
FIG. 4 is a sectional view showing the camera system according to this embodiment with an imaging lens unit yet to be fitted.

FIG. 4 is a sectional view showing the camera system according to this embodiment with an imaging lens unit yet to be fitted.

In FIG. 4, the imaging lens unit 110 yet to be fitted is placed on the camera body 150 and the push head 120 on the imaging lens unit 110 is in contact with the mount barrier 152 on the camera body 150. At this stage, the projections 101 (see FIG. 1) are yet to be engaged with the engaging parts 102 (see FIG. 1) which are designed to be engaged with the projections 101 and the lens-unit-side electrical contact points 121 are away from the body-side electrical contact points 170.

The camera body 150 is equipped with the concave mount section 151 in which the imaging lens unit 110 is mounted removably. The mount section 151 contains the body-side electrical contact points 170 and the mount barrier 152. The body-side electrical contact points 170 are connected to a circuit board 173 which is installed in the camera body 150 and on which the CPU 154 (see FIG. 3) and other elements are mounted. The connection between the body-side electrical contact points 170 and the lens-unit-side electrical contact points 121 allow transmission and reception between the camera body 150 and the imaging lens unit 110.

The mount barrier 152 closes the opening in the mount section 151. When the imaging lens unit 110 is mounted, it retreats into the recess in the mount section 151 by being pushed by the imaging lens unit 110. The mount barrier 152 is connected with a conductor 174 serving as an electrical ground of the circuit board 173 in the camera body 150 via a spring 171. The mount barrier 152 is intended to protect the body-side electrical contact points 170 from static electricity and prevent intrusion of dirt into the camera body 150. It is made of a conductor such as aluminum.

In addition to the photographic optical system 111 (see FIG. 1) and the like, the imaging lens unit 110 is equipped with the lens-unit-side electrical contact points 121 and the push head 120 as shown in FIG. 4.

The lens-unit-side electrical contact points 121 are connected to a circuit board 123 which is installed in the imaging lens unit 110 and on which the sub CPU 117 (see FIG. 3) and other elements are mounted.

The lens-unit-side electrical contact points 121 are located farther from the camera body 150 than the push head 120 as viewed from the camera body 150 with the imaging lens unit mounted. When the imaging lens unit 110 is mounted on the camera body 150, the push head 120 pushes the mount barrier 152 into the recess in the mount section 151 and then the lens-unit-side electrical contact points 121 are electrically connected to the body-side electrical contact points 170.

The push head 120 is connected with a conductor 124 serving as an electrical ground of the circuit board 123 in the imaging lens unit 10. It connects the grounds of the imaging lens unit 110 and the camera body 150 with each other by abutting on the mount barrier 152 on the camera body 150 when the imaging lens unit 110 is mounted.

According to this embodiment, the mount barrier 152 covers the opening in the mount section 151 under the urging force of the spring 171 and when the imaging lens unit 110 is mounted on the camera body 150, it retreats into the recess in the mount section 151 by being pushed by the push head 120. When the imaging lens unit 110 is removed from the camera body 150, the mount barrier 152 returns under the urging force of the spring 171 to the position where it closes the opening in the mount section 151. One end of the spring 171 is attached to the mount barrier 152 and the other end is attached to the conductor 174 which serves as an electrical ground of the circuit board 173 on which various built-in elements of the camera body 150 are mounted. This simple mechanism consisting of the spring 171 attached to the mount barrier 152 can protect the camera body 150 from breakdown and malfunctions caused by electrostatic discharge as well as from intrusion of dirt and the like after the imaging lens unit 110 is removed.

Figure 5:
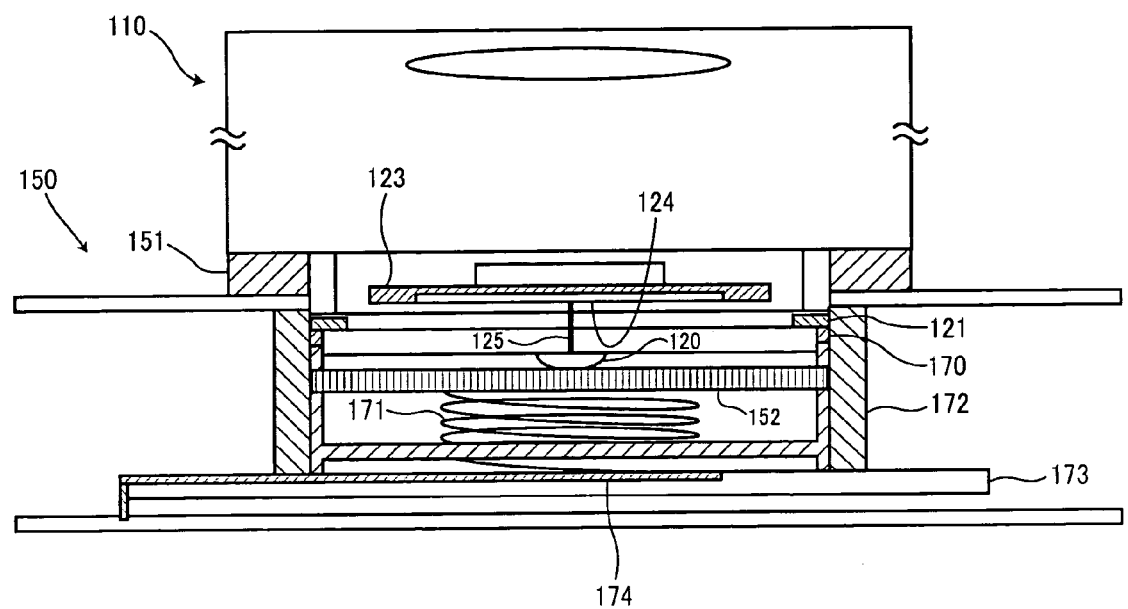
FIG. 5 is a sectional view showing the camera system according to this embodiment with the imaging lens unit fitted.

FIG. 5 is a sectional view showing the camera system according to this embodiment with the imaging lens unit fitted. After the state shown in FIG. 4, the imaging lens unit 110 is fitted in the camera body 150 as shown in FIG. 5 according to the following procedures. Specifically, the mount barrier 152 on the camera body 150 is pushed into the recess in the mount section 151 by the push head 120 provided on the imaging lens unit 110. Then, the imaging lens unit is turned to engage the projections 101 (see FIG. 1) on the imaging lens unit 110 with the engaging parts 102 (see FIG. 1) in the camera body 150.

According to this embodiment, the opening in the mount section 151 is closed by the mount barrier 152 when the imaging lens unit 110 is not mounted. When mounting the imaging lens unit 110, the mount barrier 152 retreats into the recess in the mount section 151 by being pushed by the push head 120 on the imaging lens unit 110. The conductor 124 connected to the push head 120 and serving as an electrical ground of the imaging lens unit 110 and the conductor 174 connected to the mount barrier 152 and serving as an electrical ground of the camera body 150 are connected with each other so that the grounds of the imaging lens unit 110 and the camera body 150 have the same potential.

Thus, even if the user holds the imaging lens unit 110 with an electrostatically-charged hand and supports non-conductive part of the camera body 150, the charge with a potential difference of several kilovolts generated between the imaging lens unit 110 and the camera body 150 is discharged to the camera body 150 via the push head 120 before the body-side electrical contact points 170 approaches the lens-unit-side electrical contact points 121. This prevents high voltage from being applied between the electrical contact points.

In this way, when the potentials of the imaging lens unit 110 and camera body 150 are equalized, the imaging lens unit 110 is inserted deep into the recess in the mount section 151, the imaging lens unit 110 is turned around the optical axis of the lens in a predetermined direction, thereby engaging the projections 101 (see FIG. 1) with the engaging parts 102. Consequently, the body-side electrical contact points 170 are connected with the lens-unit-side electrical contact points 121. Both lens-unit-side electrical contact points 121 and body-side electrical contact points 170 include electrical contact points for power supply and grounding as well as for the CCD_RAW, the AE/AF control, and the imaging lens unit control signals. As described above, the connection between the body-side electrical contact points 170 and the lens-unit-side electrical contact points 121 allow transmission and reception of power supply and various signals between the camera body 150 and the imaging lens unit 110.

Also, according to this embodiment, when the imaging lens unit 110 is removed from the camera body 150, the lens-unit-side electrical contact points 121 and body-side electrical contact points 170 are positioned electrically apart from each other while the push head 120 and the mount barrier 152 remain in contact.

Thus, when removing the imaging lens unit 110 from the camera body 150, as the imaging lens unit 110 is turned in the direction opposite to the direction in which it is turned when it is mounted, the projections 101 (see FIG. 1) are disengaged from the engaging parts 102 and the body-side electrical contact points 170 and the lens-unit-side electrical contact points 121 are disconnected. Even when the electrical contact points are disconnected, the push head 120 and the mount barrier 152 remain in contact, and the ground of the imaging lens unit 110 and the ground of the camera body 150 are disconnected only after the electrical contact points are disconnected. Thus, even if the imaging lens unit 110 is grabbed with an electrostatically-charged hand, electrostatic discharge into the lens-unit-side electrical contact points 121 or body-side electrical contact points 170 can be avoided. This in turn prevents breakdown and malfunctions of the elements in the imaging lens unit 110.

If exterior 122 (see FIG. 4) of the imaging lens unit 110 is made of metal, the exterior 122 has the same potential as the grounds, and thus it is possible to prevent breakdown and malfunctions of the entire imaging lens unit 110 due to electrostatic discharge.

Also, if exterior 175 (see FIG. 4) of the camera body 150 is made of metal, it has the same potential as the ground of the camera body 150 to which it is connected regardless of the state of the mount barrier 152, and thus it is possible to prevent breakdown and malfunctions of the entire camera body 150 due to electrostatic discharge.

Incidentally, although in the example described above, the push head 120 protruding toward the camera body 150 is provided on the bottom of the imaging lens unit 110, the present invention is not limited to this shape. The push head on the imaging lens unit may be a flat member and the mount barrier may have a part protruding toward the imaging lens unit and abutting on the flat push head on the imaging lens unit. Also, it is possible to install a protruding push head on the imaging lens unit and equip the mount barrier with a protruding part to abut on the push head.

Also, when the imaging lens unit and mount barrier are placed in contact, if a sufficient distance can be maintained between their electrical contact points, the push head 120 may be made of a flat member and the mount barrier which abuts the push head 120 may have a flat shape without projecting.

Figure 6:
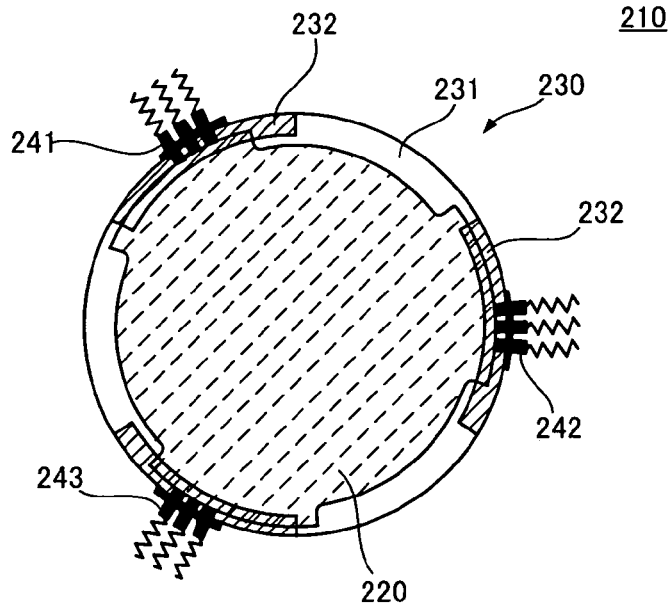
FIG. 6(*a*) is a front view of a mount section according to an example as viewed from behind the camera.
Figure 6:
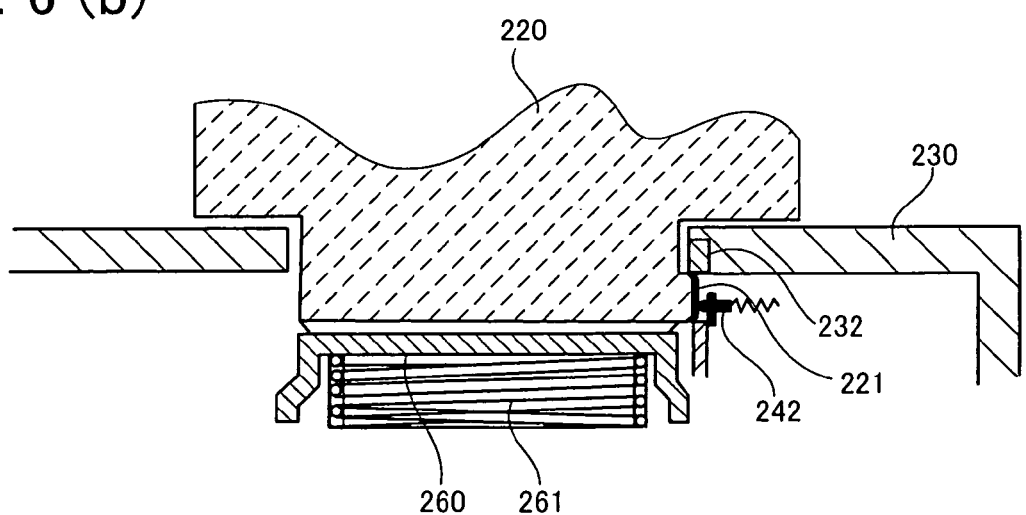

FIGS. 6(*a*) and 6(*b*), which show another example of the present invention, are explanatory diagrams illustrating a layout example of connection terminals in a mount section 210 of an interchangeable lens camera. FIG. 6(*a*) is a front view of the mount section as viewed from behind the camera. FIG. 6(*b*) is a longitudinal sectional view of the mount section 210 with an imaging lens unit 220 mounted on a camera body 230. Claws 232 as well as missing parts 231 between claws are shown on the mount on the camera body. Separate terminal blocks 241, 242, and 243 are provided on the back of the respective claws 232.

As shown in FIG. 6(*a*), the power supply terminal block 242, the signal terminal block 243, and the ground terminal block 241 are disposed as independent blocks at separated locations. Insertion/removal position of the camera mount and the lens mount depends on the size and arrangement of the claws. Specifically, the camera mount and the lens mount have their claw angles adjusted in advance and engage only at a position where specific claws meet. Thus, when mounting the imaging lens unit 220 on the camera body 230, since the insertion position is fixed, there is no possibility that wrong terminals will contact each other resulting in a short circuit. Also, since the power supply terminal block is wide apart from the other terminal blocks, intrusion of a foreign object such as a metal strip does not cause a short circuit.

As shown in FIG. 6(*b*), for example, the terminal block 242 which is placed in contact with a terminal 221 of the imaging lens unit 220 is provided on the back of a claw 232 and the contact points of the connection terminals in the terminal block 242 are protected by the claw 232. Incidentally, FIG. 6(*b*) also shows a barrier 260 which closes a lens unit mounting hole when the imaging lens unit 220 is removed and a spring 261 which urges the barrier 260 to the closing position.

Figure 7:
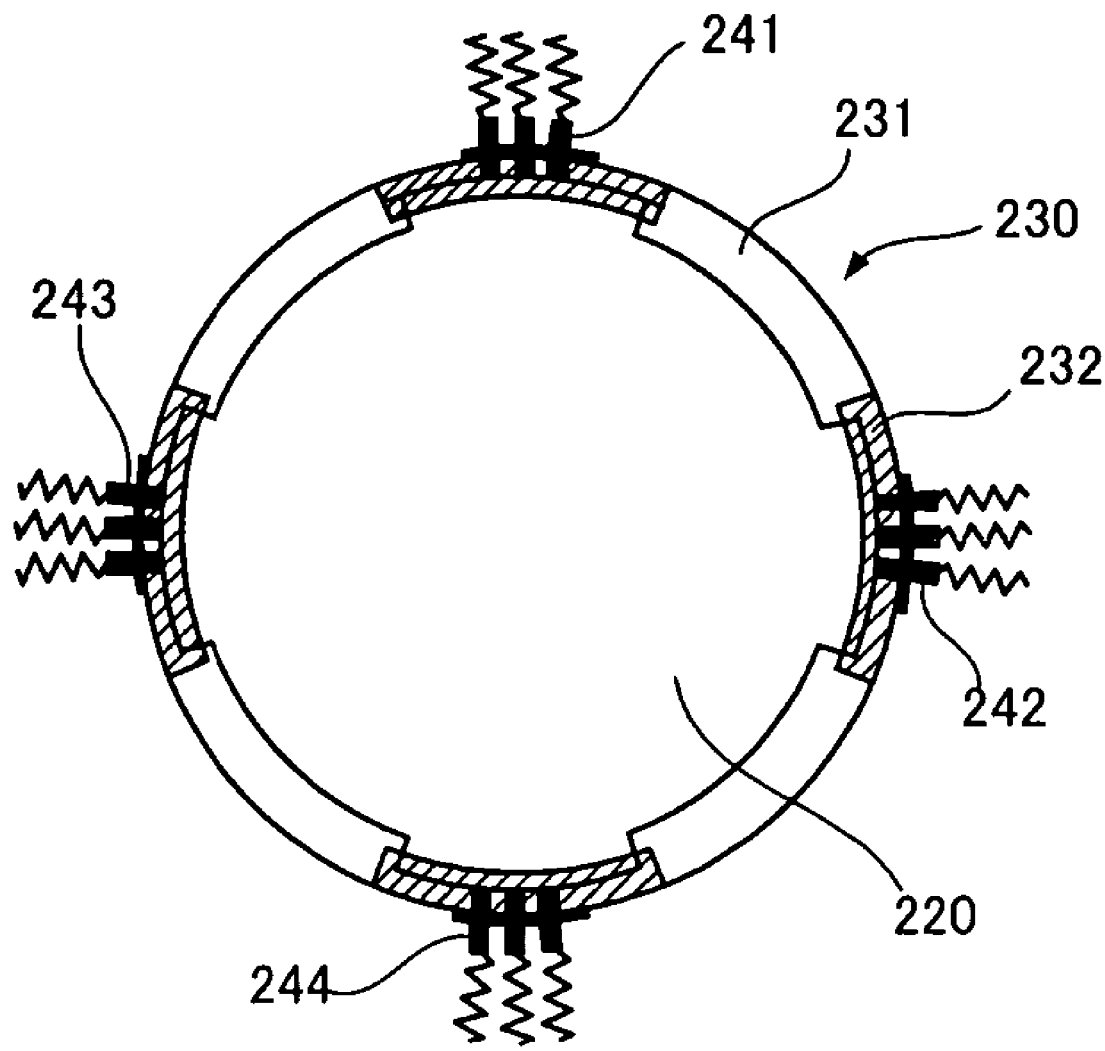
FIG. 7 is a front view of a mount section according to another example as viewed from behind the camera.

FIG. 7 is an explanatory diagram illustrating another example of the present invention. In FIG. 7, the imaging lens unit 220, the camera body 230, the claws 232, the missing parts 231, and terminal blocks 241 and 242 are the same as those in FIG. 6. As shown in FIG. 7, the ground terminal block 241, the power supply terminal block 242, and the signal terminal blocks 243 and 244 are independent blocks. Since signal terminals are grouped into two signal terminal blocks 243 and 244, it is possible to divide signals into, for example, high-speed serial signals and analog signals, and thereby avoid electrical interference.

Figure 8:
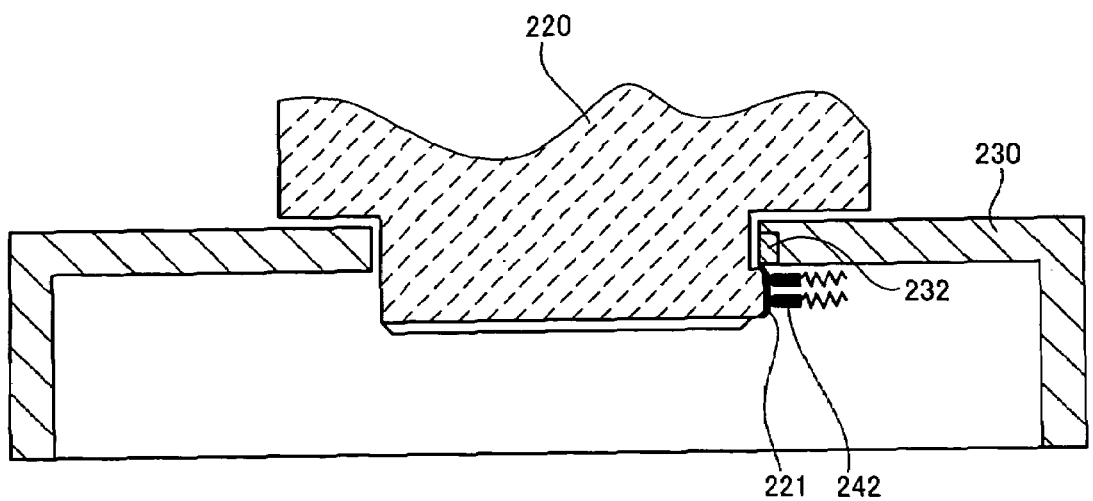
FIG. 8 is a longitudinal sectional view of the mount section according to the other example.
Figure 9:
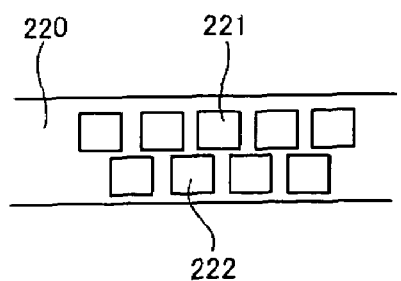
FIG. 9 is a front view showing a layout example of contact points on a lens unit.

FIG. 8 is a longitudinal sectional view showing connection terminals arranged in two layers along the optical axis. FIG. 9 is a front view (developed view) of the two layers of connection terminals. Although FIG. 9 shows an example in which the two layers 221 and 222 of connection terminals are arranged in staggered pattern, this is not restrictive and the connection terminals may be arranged in a grid or honeycomb pattern. Also, the connection terminals may have different sizes or be arranged at different intervals. By arranging connection terminals in multiple layers, it is possible to increase the number of connection terminals provided behind claws whose length in the circumferential direction is limited.

Figure 10:
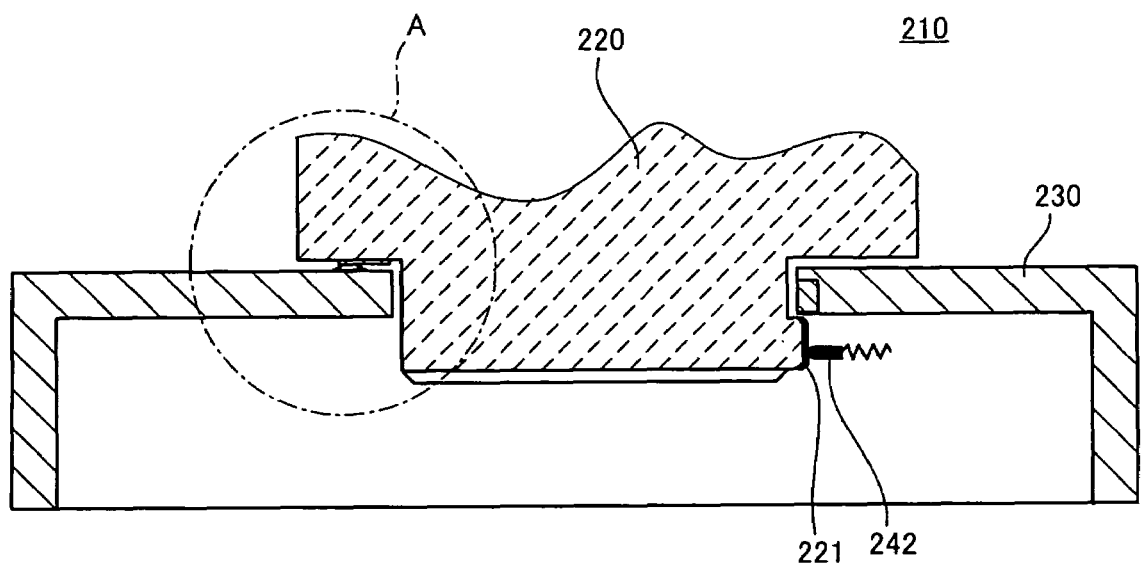
FIG. 10 is a longitudinal sectional view of a mount section according to still another example.
Figure 11:
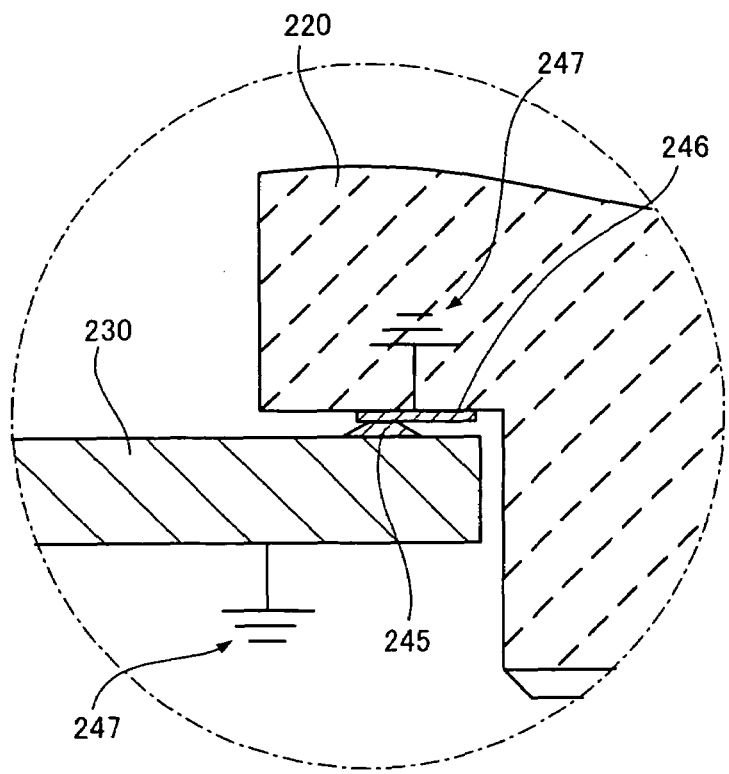
FIG. 11 is an enlarged view of part A in FIG. 10.

FIG. 10 shows a configuration in which a ground is connected directly between the mount on the lens unit 220 and the mount on the camera body 230 instead of using ground terminals. FIG. 11 is an enlarged view of part A in FIG. 10. A ground section 246 is provided directly on the mount on the lens unit 220 and a ground section 245 is provided on the mount on the camera body 230 and both of them are earthed 247 so that the grounds will be connected automatically when the lens unit 220 and the camera body 230 are coupled. This technique allows ground terminals to be omitted, making it easier to divide electrical connection terminals into blocks.

Figure 12:
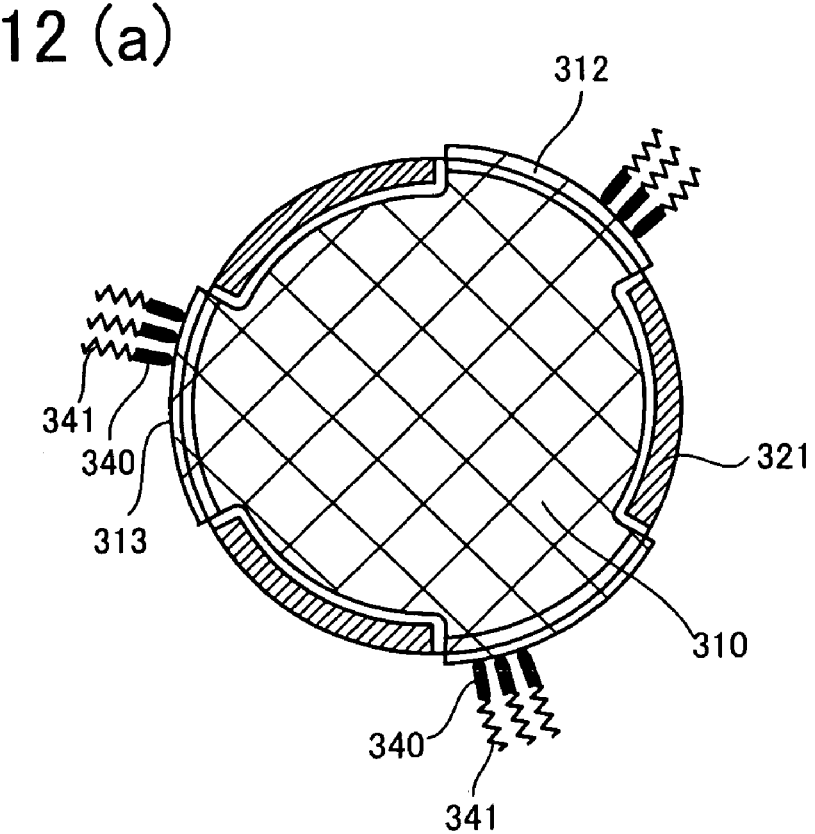
FIG. 12(a) is a front view of a barrier.
FIG. 12(b) is a longitudinal sectional view of the barrier.
Figure 12:
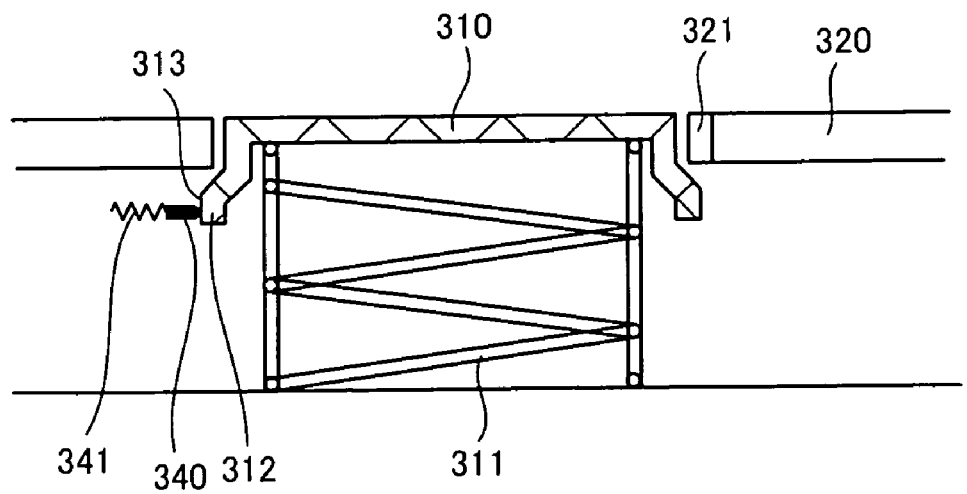
Figure 13:
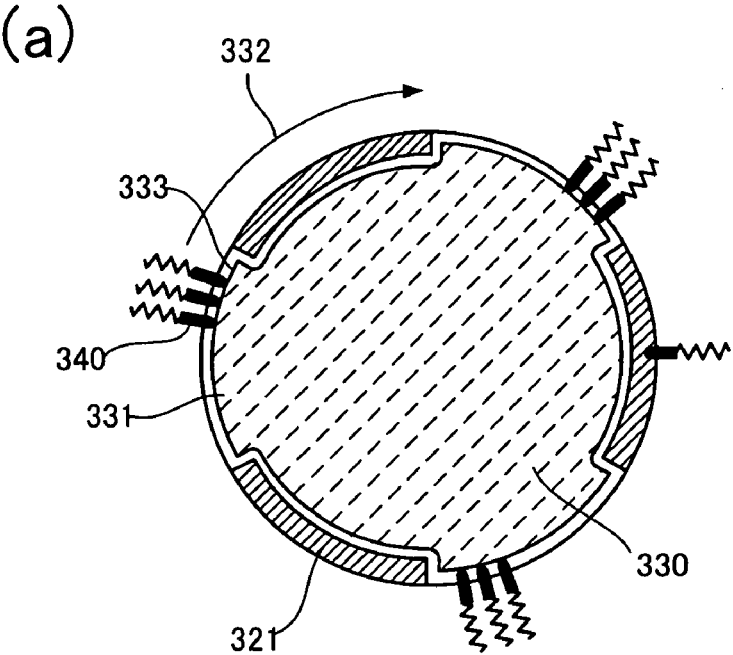
FIG. 13(a) is a front view showing relationship between a mount on a lens unit and mount on a camera body.
FIG. 13(b) is a longitudinal sectional view of FIG. 13(a)
Figure 13:
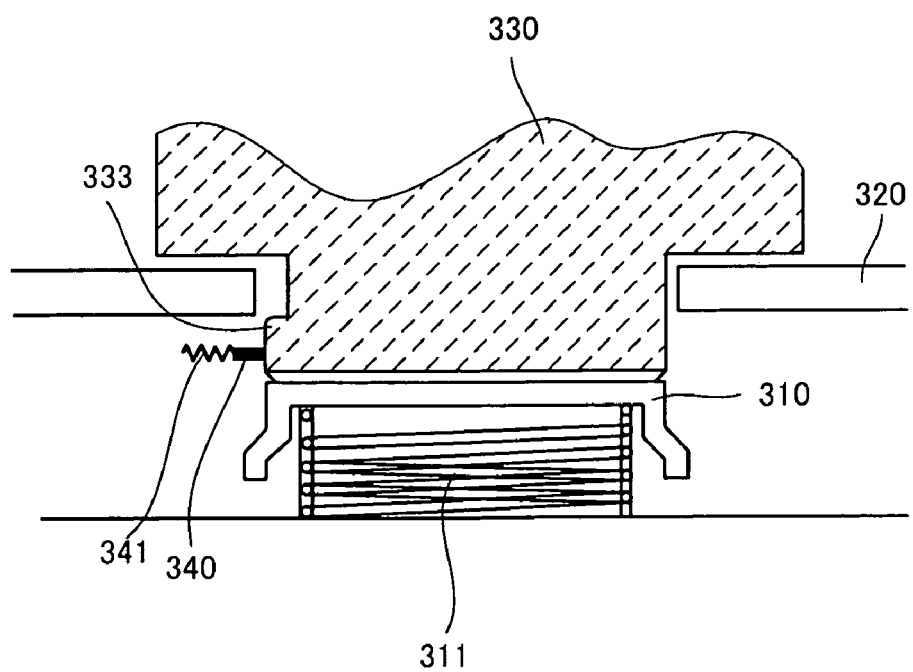
Figure 14:
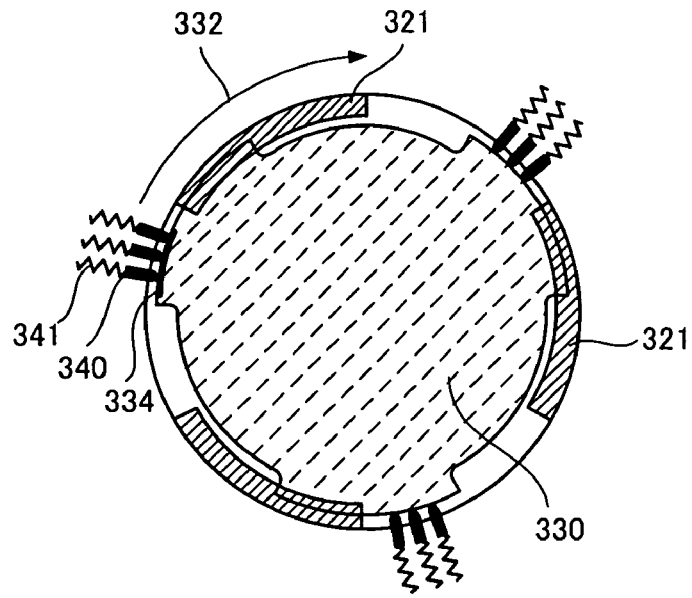
FIG. 14(a) is a front view showing the lens-side mount and camera-side mount engaged together.
FIG. 14(b) is a longitudinal sectional view of FIG. 14(a)
Figure 14:
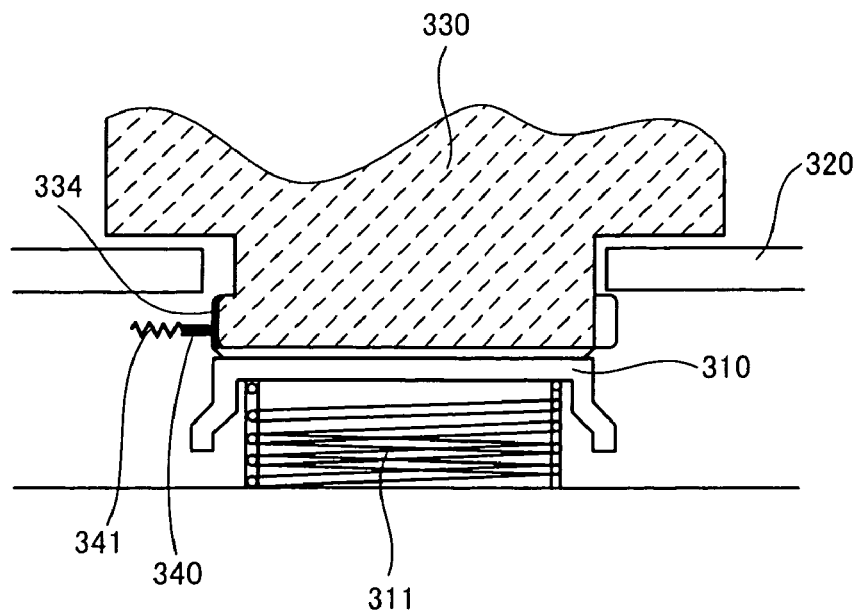

FIGS. 12 to 14 are explanatory diagrams illustrating another example of the present invention.

FIG. 12(*a*) is a front view of a barrier 310 viewed from the front and FIG. 12(*b*) is a longitudinal sectional view of the barrier. FIG. 13(*a*) shows relationship between a mount on a lens unit 330 and a mount on a camera body 320, where the lens unit 330 is inserted in the camera body 320 from above the barrier 310 shown in FIG. 12(*a*). FIG. 13(*a*) is a front view with the main part of the lens unit 330 removed. FIG. 13(*b*) is a longitudinal sectional view of FIG. 13(*a*) with the lens unit 330 mounted. FIG. 14(*a*) shows a state in which the mount on the lens unit 330 and mount on the camera body 320 are latched together and which is brought about by turning the lens unit 330 in FIG. 13(a). It is a front view with the main part of the lens unit 330 removed. FIG. 14(b) is a longitudinal sectional view of FIG. 14(a) with the lens unit 330 mounted.

As shown in FIGS. 12(a) and 12(b), the camera body 320 of the interchangeable lens camera according to the present invention is equipped with the barrier 310 urged outward from the camera body 320 by a spring 311. As shown in FIGS. 12(a) and 12(b), the barrier 310 is equipped with flanged claws 312 located inside the camera body 320. The flanged claws 312 are inserted in the missing parts between the mount claws 321 on the camera body 320. Outer surfaces of the flanged claws 312 are abutted by contact pins (contact points) 340 of connection terminals. The contact pins 340 are urged by an elastic material 341 in such a way as to push against the flanks 313 of the flanged claws 312 of the barrier 310. When the lens unit 330 is pushed into the camera body 320 as shown in FIGS. 13(a) and 13(b), the barrier 310 moves into the camera, bringing the contact pins 340 into contact with outer peripheries 333 of the mount claws 331 on the lens unit 330. Then, the lens unit 330 is turned around the optical axis in the direction indicated by an arrow 332.

The contact pins 340 are urged toward the optical axis by the elastic material 341 and remains in contact with the flanks of (outer surfaces 313) (see FIG. 12(b)) of the flanged claws 312 of the barrier 310 while the barrier 310 is closed. The part in contact with the contact pins 340 of the barrier 310 is insulated. Also, as shown in FIG. 13(b), when the barrier 310 retracts in the insertion direction of the lens unit 330, the contact pins 340 come into contact with the flanks 333 of the lens unit 330. Then, as shown in FIG. 14(a), when the lens unit 330 is turned in the direction indicated by the arrow 332, the contact pins 340 come into contact with a terminal 334 of the lens unit 330 as shown in FIGS. 14(a) and 14(b). This system has the advantage of being able to increase the number of connection terminals when the lens unit 330 turns a short distance into engagement.

Figure 15:
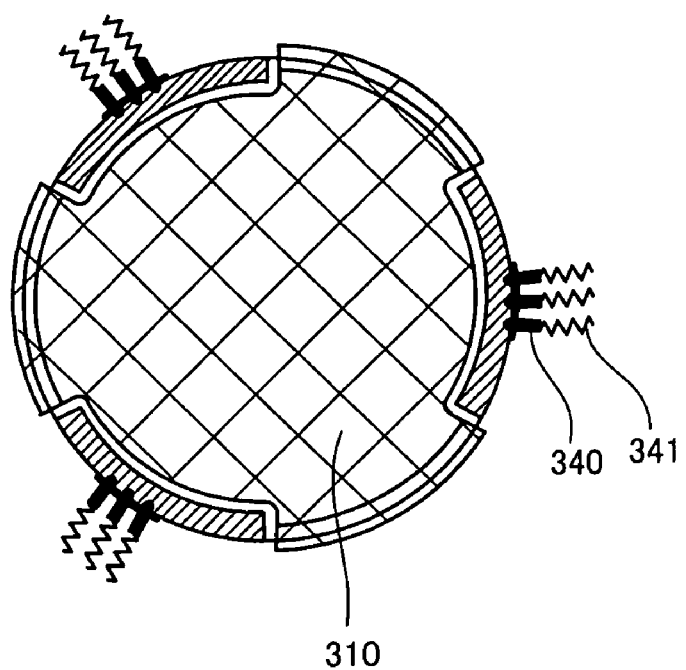
FIG. 15(a) is a front view of a barrier.
FIG. 15(b) is a longitudinal sectional view of the barrier.
Figure 15:
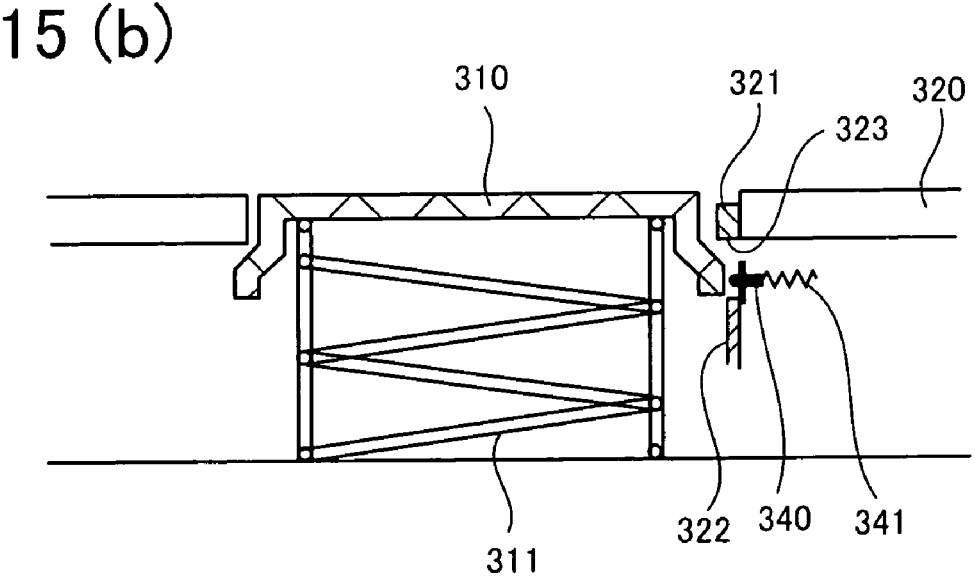
Figure 16:
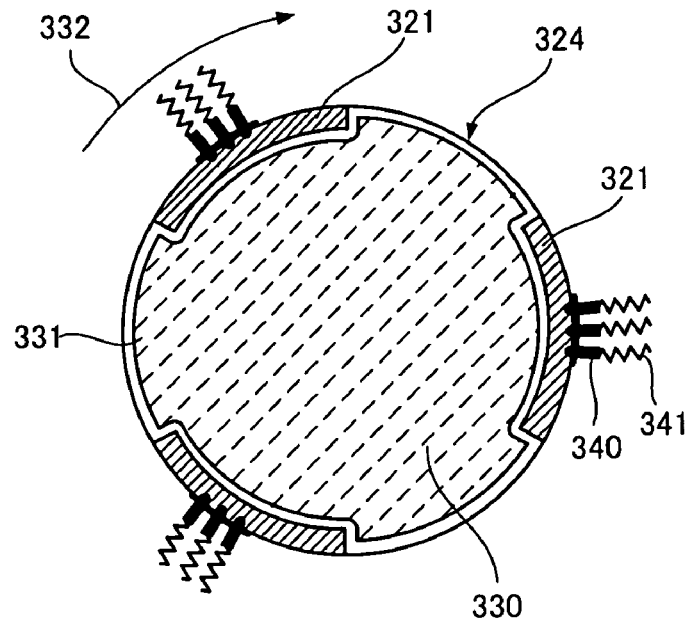
FIG. 16(a) is a front view showing relationship between a mount on a lens unit and mount on a camera body.
FIG. 16(b) is a longitudinal sectional view of FIG. 16(a)
Figure 16:
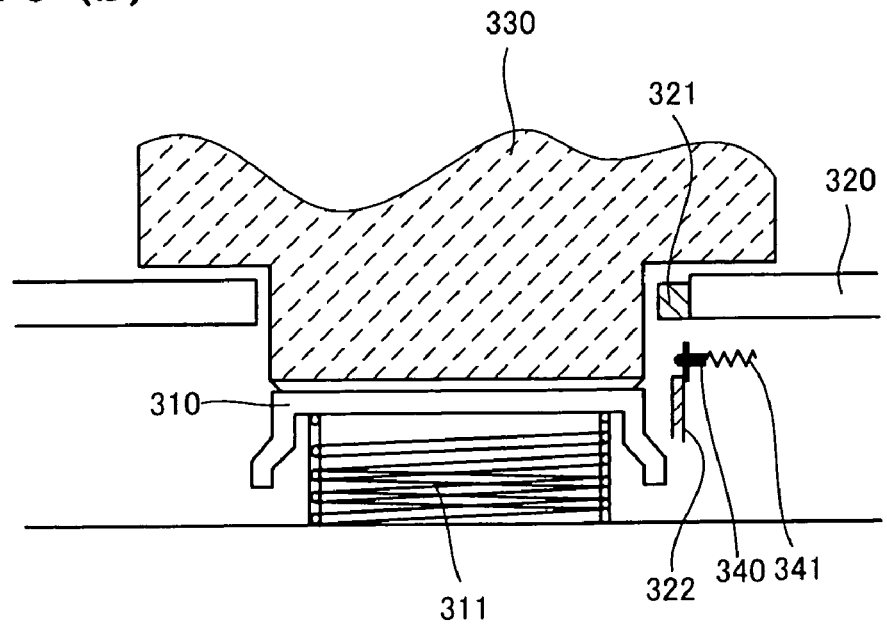
Figure 17:
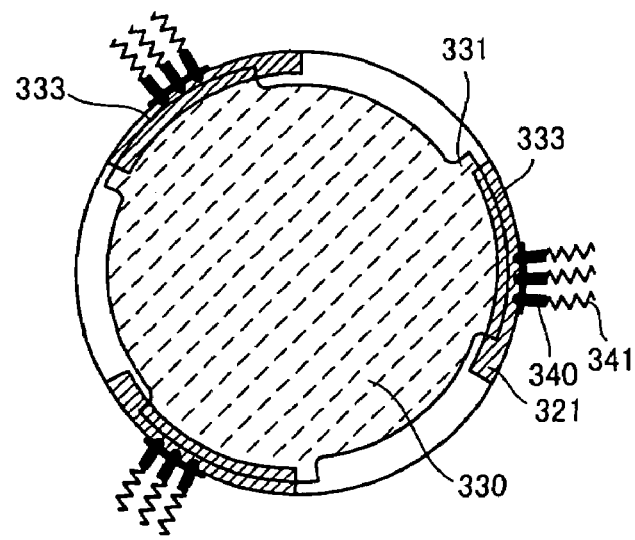
FIG. 17(a) is a front view showing the lens-side mount and camera-side mount latched together.
FIG. 17(b) is a longitudinal sectional view of FIG. 17(a)
Figure 17:
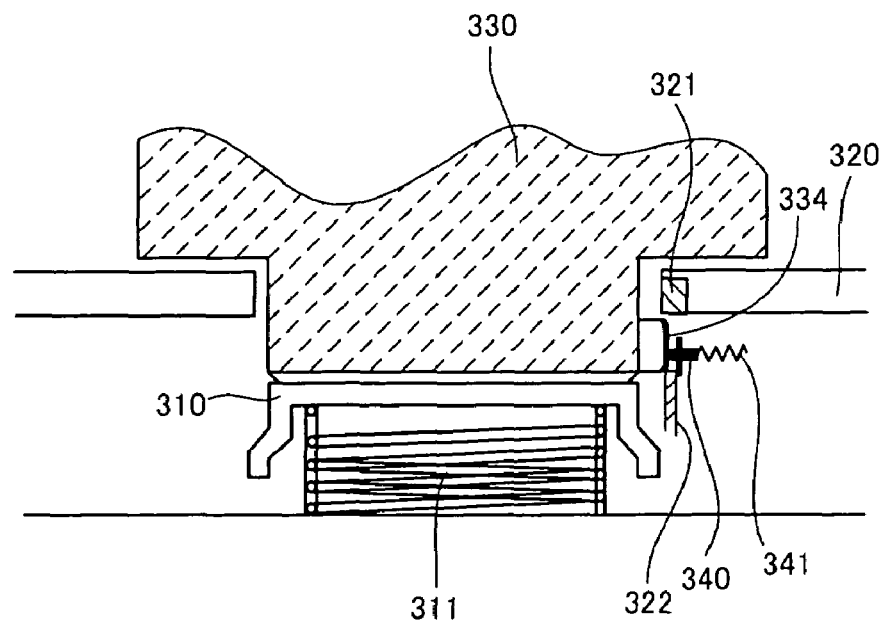

FIGS. 15 to 17 are explanatory diagrams illustrating an example in which contact points (contact pins 340) on the camera body 320 are arranged on the back of the mount claws 321 on the camera body 320.

FIG. 15(a) is a front view of the barrier 310 viewed from the front of the camera body 320 and FIG. 15(b) is a longitudinal sectional view of the barrier. FIG. 16(a) is a front view showing relationship between the mount on the lens unit 330 and the mount on the camera body 320 when the lens unit 330 is pushed in the camera body 320 shown in FIG. 15(a), but the main part of the lens unit 330 is not shown. FIG. 16(b) is a longitudinal sectional view of FIG. 16(a) with the lens unit 330 mounted. FIG. 17(a) shows a state in which the mount on the lens unit 330 and the mount on the camera body 320 are latched together, the state being brought about by turning the lens unit 330 in FIG. 16(a). It is a front view with the main part of the lens unit 330 removed. FIG. 17(b) is a longitudinal sectional view of FIG. 17(a) with the lens unit 330 mounted.

As shown in FIGS. 15(a) and 15(b), the camera body 320 is equipped with the barrier 310 urged outward from the camera body 320 by the spring 311.

The contact pins 340 on the camera body 320 are disposed on the back of the mount claws 321 on the camera body 320. The back of the mount claws 321 means back surfaces 323 of the mount claws 321 or a space behind the mount claws 321. The contact pins 340 are urged toward the barrier 310 by the spring 341 and positioned by a stopper 322 so as not to hit the barrier 310. Incidentally, the contact pins 340 may be installed behind the back surfaces 323 of the mount claws 321 in such a way as to protrude downward or may be urged radially inward in the space behind the mount claws 321 as shown in FIG. 15(b).

FIGS. 16(a) and 16(b) shows a stage at which the lens unit 330 is inserted in the camera body. The mount claws 331 on the lens unit 330 are inserted in the missing parts 324 between the mount claws 321 on the camera body 320.

As shown in FIG. 16(b), the barrier 310 is inserted into the camera body 320 in the insertion direction of the lens unit 330 when the lens unit 330 is inserted. This structure allows the lens unit 330 to be turned around the optical axis after being inserted in the camera body 320.

Also, the contact pins 340 are urged toward the center of the lens unit 330 by the elastic material 341 and are placed in the space behind the mount claws 321. The contact pins 340 are supported by the stopper 322 and do not need to remain in contact with the flanks 313 of the barrier 310 while the barrier 310 is closed. Also, when the barrier 310 retracts in the insertion direction of the lens unit 330, the contact pins 340 do not come into contact with the flanks 333 of the lens unit 330. As shown in FIGS. 17(a) and 17(b), when the rotation and engagement of the lens unit are completed, the contact pins 340 come into contact with the terminal 334 placed on a flank of the mount claws 331 of the lens unit 330.

The system of the example shown in FIGS. 15 to 17 has the advantage of being able to increase the number of the connection terminals when the lens unit turns a long distance into engagement.

Figure 18:
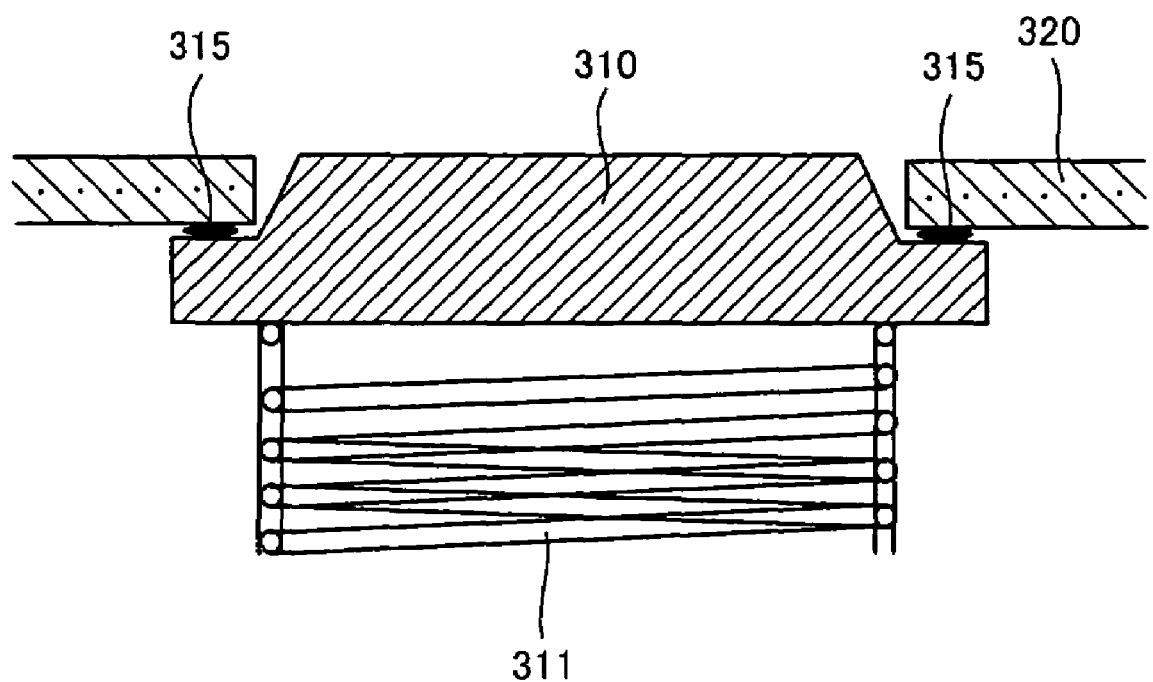
FIG. 18 is a longitudinal sectional view of a barrier according to an example.

FIG. 18 is a longitudinal sectional view of the barrier 310, where rubber seals 315 are attached to that surface of the barrier 310 which comes into contact with the mount on the camera body 320. The rubber seals 315 have dust-proofing and drip-proofing effects. Alternatively, a rubberized coating may be applied to the contact surface. The rubberized coating is obtained by spraying a paint mixed with rubber to the work surface.

The present invention can implement a small and reliable camera system which can prevent electrostatic discharge from causing breakdown or malfunctions when a lens unit is mounted or removed as well as a camera body and a lens unit composing the camera system.

The present invention divides electrical connection terminals between the lens unit and the camera body into multiple blocks according to types, disposes the blocks at separate locations on a circumference of a connection section of a mount section on the interchangeable lens camera, and positions a power supply terminal block in such a way as to be connected after other terminal blocks are connected. Thus, the present invention may prevent electrical connection terminals from being short-circuited easily by foreign matter, deal with increases in the number of signal lines, and keep signal terminals free of noise or interference.

Incidentally, by placing a ground directly in a contact section between the lens unit and the camera body, it is possible to omit ground connection terminals.

In an interchangeable lens camera in which a lens unit is pushed in along an optical axis, turned around the optical axis, and thereby engaged with a camera body: the camera body is equipped with a barrier urged against an insertion direction of the lens unit; the barrier is configured to retract along with insertion of the lens unit and reveal camera-body-side contact points along with the retraction; and lens-unit-side contact points engage with the camera-body-side contact points when the lens unit is turned around the optical axis into engagement with the camera body; and thus the contact points are protected effectively.

What is claimed is:

1. A camera system that has an imaging lens unit equipped with a photographic optical system and an image pickup device; and a camera body which is equipped with a concave mount section to removably mount the imaging lens unit, communicates with the imaging lens unit mounted in the mount section, and performs signal processing on image signals received from the imaging lens unit, wherein:

the camera body comprises body-side electrical contact points installed in the mount section and used to communicate with the imaging lens unit, and a mount barrier which is connected to an electrical ground of the camera body, covers an opening in the mount section, and retreats into a recess in the mount section by being pushed by the imaging lens unit when the imaging lens unit is mounted; and the imaging lens unit comprises a push head which is connected to an electrical ground of the imaging lens unit, connects the ground of the imaging lens unit with a ground of the camera body by abutting on the mount barrier when the imaging lens unit is mounted, and pushes the mount barrier into a recess in the mount section, and lens-unit-side electrical contact points which are located farther from the camera body than the push head as viewed from the camera body with the imaging lens unit mounted and are connected with the body-side electrical contact points as the push head starts to push the mount barrier into the recess in the mount section when the imaging lens unit is mounted.

2. The camera system according to claim 1, wherein:
the mount barrier covers the opening in the mount section by being urged by a spring; and
the mount barrier retreats into the recess in the mount section by being pushed by the push head when the imaging lens unit is mounted and returns under the force of the spring to where the mount barrier covers the mount opening when the imaging lens unit is removed.

3. The camera system according to claim 1, wherein when the imaging lens unit is removed from the camera body, the lens-unit-side electrical contact points and body-side electrical contact points are positioned electrically apart from each other while the push head and the mount barrier remain in contact.

4. A camera body which has a concave mount section to removably mount an imaging lens unit equipped with a photographic optical system and an image pickup device, communicates with the imaging lens unit mounted in the mount section, and performs signal processing on image signals received from the imaging lens unit, the camera body comprising:

body-side electrical contact points installed in the mount section and used to communicate with the imaging lens unit, and a mount barrier which is connected to an electrical ground of the camera body, covers an opening in the mount section, and retreats into a recess in the mount section by being pushed by the imaging lens unit when the imaging lens unit is mounted.

5. An imaging lens unit which is equipped with a photographic optical system and an image pickup device, is removably mounted in a concave mount section provided on a camera body, and transmits image signals obtained by the image pickup device to the camera body, wherein:

the camera body comprises body-side electrical contact points installed in the mount section and used to communicate with the imaging lens unit, and a mount barrier which is connected to an electrical ground of the camera body, covers an opening in the mount section, and retreats into a recess in the mount section by being pushed by the imaging lens unit when the imaging lens unit is mounted, and the imaging lens unit comprises a push head which is connected to an electrical ground of the imaging lens unit, connects the ground of the imaging lens unit with a ground of the camera body by abutting on the mount barrier when the imaging lens unit is mounted, and pushes the mount barrier into a recess in the mount section, and lens-unit-side electrical contact points which are located farther from the camera body than the push head as viewed from the camera body with the imaging lens unit mounted and are connected with the body-side electrical contact points as the push head starts to push the mount barrier into the recess in the mount section when the imaging lens unit is mounted.

6. An interchangeable lens camera in which a lens unit is pushed in along an optical axis, turned around the optical axis, and thereby engaged with a camera body, wherein: the camera body is equipped with a barrier urged against an insertion direction of the lens unit; the barrier is configured to retract along with insertion of the lens unit and reveal camera-body-side contact points along with the retraction; and the lens unit is equipped with contact points which engage with the camera-body-side contact points when the lens unit is turned around the optical axis into engagement with the camera body.

7. The interchangeable lens camera according to claim 6, wherein the camera-body-side contact points are disposed on the back of mount claws on the camera body.

8. The interchangeable lens camera according to claim 6, wherein a contact surface of the barrier which comes into contact with the lens unit is equipped with rubber or coated with a rubberized paint.

9. The interchangeable lens camera according to claim 6, wherein the barrier is a transparent member.

* * * * *